(12) United States Patent
Merassi et al.

(10) Patent No.: US 7,520,171 B2
(45) Date of Patent: Apr. 21, 2009

(54) MICRO-ELECTROMECHANICAL STRUCTURE WITH SELF-COMPENSATION OF THE THERMAL DRIFTS CAUSED BY THERMOMECHANICAL STRESS

(75) Inventors: Angelo Merassi, Vigevano (IT); Sarah Zerbini, Cornaredo (IT); Benedetto Vigna, Pietrapertosa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 589 days.

(21) Appl. No.: 11/226,930

(22) Filed: Sep. 14, 2005

(65) Prior Publication Data

US 2007/0238212 A1    Oct. 11, 2007

(30) Foreign Application Priority Data

Sep. 22, 2004    (EP)    ................... 04425705

(51) Int. Cl.
   *G01P 15/125*    (2006.01)
   *G01P 3/00*    (2006.01)

(52) U.S. Cl. ...................... 73/514.32; 73/497
(58) Field of Classification Search .............. 73/514.32, 73/497, 514.29, 514.36, 514.38
See application file for complete search history.

(56) References Cited

U.S. PATENT DOCUMENTS

| | | | | |
|---|---|---|---|---|
| 5,747,991 A | | 5/1998 | Ito et al. | ...................... 324/661 |
| 5,780,885 A | * | 7/1998 | Diem et al. | .................. 257/254 |
| 5,783,973 A | | 7/1998 | Weinberg et al. | |
| 5,909,078 A | | 6/1999 | Wood et al. | |
| 5,983,721 A | * | 11/1999 | Sulzberger et al. | ........ 73/514.32 |
| 6,070,464 A | * | 6/2000 | Koury et al. | .............. 73/514.32 |
| 6,591,678 B2 | * | 7/2003 | Sakai | ........................ 73/514.36 |
| 6,823,733 B2 | * | 11/2004 | Ichinose | ................... 73/504.02 |
| 2005/0132805 A1 | * | 6/2005 | Park et al. | ................. 73/514.32 |

FOREIGN PATENT DOCUMENTS

| | | |
|---|---|---|
| DE | 42 26 430 | 2/1994 |
| DE | 198 32 906 | 2/2000 |
| EP | 1217735 A1 | 6/2002 |
| WO | WO 98/52051 | 11/1998 |
| WO | WO 03/106927 | 12/2003 |

OTHER PUBLICATIONS

Esashi, M. et al., "Packaged Micromechanical Sensors," 1994 IEEE Symposium on Emerging Technologies & Factory Automation, Tokyo, Japan, Nov. 6-10, 1994, pp. 30-37.

Moe, S. T., et al., "Capacitive Differential Pressure Sensor for Harsh Environments," Sensors and Actuators, 83(2000), May 2000, pp. 30-33.

Seidel, H., et al., "A Piezoresistive Silicon Accelerometer with Monolithically Integrated CMOS-Circuitry," Transducers '95—Eurosensors IX, The 8th International Conference on Solid-State Sensors and Actuators, and Eurosensors IX, Stockholm, Sweden, Jun. 25-29, 1995, pp. 597-600.

* cited by examiner

*Primary Examiner*—Helen C. Kwok
(74) *Attorney, Agent, or Firm*—Lisa K. Jorgenson; Harold H. Bennett, II; Seed IP Law Group PLLC

(57) ABSTRACT

In a micro-electromechanical structure of semiconductor material, a detection structure is formed by a stator and by a rotor, which are mobile with respect to one another in presence of an external stress and are subject to thermal stress; a compensation structure of a micro-electromechanical type, subject to thermal stress and invariant with respect to the external stress, is connected to the detection structure thereby the micro-electromechanical structure supplies an output signal correlated to the external stress and compensated in temperature.

36 Claims, 4 Drawing Sheets

MICRO-ELECTROMECHANICAL STRUCTURE WITH SELF-COMPENSATION OF THE THERMAL DRIFTS CAUSED BY THERMOMECHANICAL STRESS

BACKGROUND OF THE INVENTION

1. Field of the Invention

The present invention relates to a micro-electromechanical structure with self-compensation of the thermal drifts caused by thermomechanical stress.

2. Description of the Related Art

The following description will make reference, to an inertial sensor, in particular to a linear accelerometer, without losing generality. As is known, micromachining techniques enable micro-electromechanical structures (MEMS) to be obtained within layers generally of semiconductor material, which have been deposited (for example, a polycrystalline silicon layer) or grown (for example, an epitaxial layer) on top of sacrificial layers, which are removed via etching.

In particular, inertial sensors obtained using micromachining techniques comprise mobile regions (rotor regions) suspended with respect to a substrate, and fixed regions (stator regions) anchored and fixed to the substrate and in particular to the package of the sensor. The rotor regions are connected to the substrate via elastic biasing elements (springs) and consequently are mobile with respect to the stator regions along one or more axes, which define the detection axes of the sensor.

The various regions that make up the micro-electromechanical structure can have different coefficients of thermal expansion, especially when they are subjected to different doping levels. Furthermore, the material of the package of the micro-electromechanical structure has a different coefficient of thermal expansion with respect to the material of the structure (generally mono- or polycrystalline silicon). Consequently, the silicon die of the microstructure at the end of the machining operations may be subjected to residual thermomechanical stress (a phenomenon known as "die warpage"), and in particular the mobile masses may undergo small relative displacements with respect to the fixed regions.

The presence of residual stress leads to considerable problems for the proper operation of micro-electromechanical structures, in particular of micro-electromechanical sensors. For example, in the case of micro-electromechanical structures comprising a mobile mass equipped with a plurality of anchoring points, the thermomechanical stress acting in a different and non-uniform way on the various anchoring points tends to create tensile and compressive stresses and to modify the positions of the various parts of the structure with respect to one another. This leads to alterations in the performance of the sensors, in particular measurement errors and drifts, which are moreover variable according to the production lot and at times also among sensors belonging to a same production lot.

In order to compensate for the aforementioned measurement drifts, a wide range of solutions has been proposed. In particular, generally, these solutions compensate electronically the thermal drifts of the measurement supplied by the micro-electromechanical sensor by adding appropriate electronic components in the reading interface associated to the sensor.

For example, one solution envisages the use of a temperature sensor in the reading electronics associated to the micro-electromechanical sensor. Once the temperature is known, the drifts of the system are compensated electronically using compensation curves previously obtained from appropriate calibration procedures. This solution proves particularly burdensome in so far as it calls for costly and delicate measurement procedures to obtain compensation curves that accurately map the thermal drifts of the sensors, as well as appropriate compensation operations.

WO03/106927 proposes the insertion of a diode in the reading electronics. By exploiting the known variation in temperature of the voltage drop of the diode, the output of the sensor is compensated by combining it with a value proportional to the voltage drop of the diode. A solution of this type is, however, valid only when the voltage drop of the diode effectively has a temperature variation comparable with the output signal of the micro-electromechanical sensor; however this situation does not occur in general, because of the structure and doping differences.

BRIEF SUMMARY OF THE INVENTION

The aim of the present invention is to overcome such limitations and in particular to enable a more effective compensation of the thermal drifts caused by the thermomechanical stress.

According to one embodiment of the present invention, there is provided a micro-electromechanical structure, that comprises a detection structure including a stator and a rotor, which are mobile with respect to one another in presence of an external stress and are subject to thermal stress and a compensation structure of micro-electromechanical type subject to the thermal stress and invariant with respect to the external stress. The compensation structure is connected to the detection structure and thereby said micro-electromechanical structure supplies an output signal correlated to the external stress and compensated in temperature.

According to other embodiments of the present invention, there is also provided a method for self-compensating thermal-drifts comprising providing a detection structure including a stator and a rotor, which are mobile with respect to one another in presence of an external stress and are subject to thermal stress. The method further comprises connecting the detection structure to a compensation structure of micro-electromechanical type subject to the thermal stress and invariant with respect to the external stress as well as biasing the detection structure and the compensation structure, thereby generating an output signal correlated to the external stress and compensated in temperature.

BRIEF DESCRIPTION OF THE SEVERAL VIEWS OF THE DRAWINGS

For a better understanding of the present invention, there are now described some preferred embodiments, provided purely by way of non-limiting example, with reference to the attached drawings, wherein.

DETAILED DESCRIPTION OF THE INVENTION

One embodiment of the present invention provide a micro-electromechanical structure having a compensation structure of a micro-electromechanical type that is insensitive to accelerations but undergoes the same thermomechanical stress as a detection structure formed in the micro-electromechanical structure. In this way, an intrinsic thermal compensation of the output of the micro-electromechanical structure is obtained, and thus no additional components are necessary in the reading electronics associated to the micro-electromechanical structure.

Figure 1:
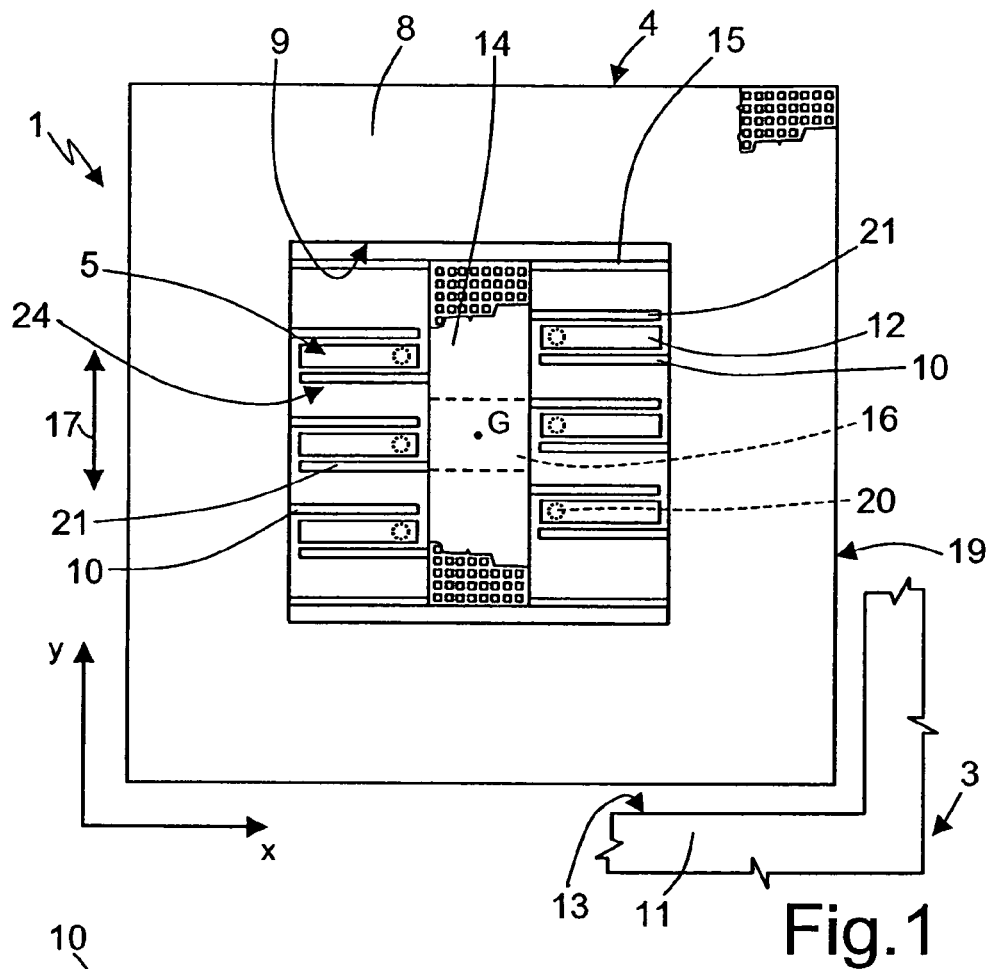
FIG. 1 is a schematic top view of a uniaxial linear accelerometer according to one embodiment of the present invention.

FIG. 1 shows an embodiment of a uniaxial accelerometer 1, of linear type, having a structure for compensating the thermal drifts, according to an embodiment of the present invention.

In particular, the uniaxial accelerometer 1 may be integrated in a chip 3 of semiconductor material and comprise a detection structure 19 for detecting accelerations. The detection structure 19 may be formed by a rotor 4 and a stator 5. The uniaxial accelerometer 1 has a centroidal axis G (defined as the axis passing through the center of gravity), which coincides with the symmetry axis of the accelerometer.

The rotor 4 comprises a suspended mass 8 substantially having the shape of a square frame, surrounded by a fixed structure 11 and separated therefrom by a trench 13. The suspended mass 8 defines a window 9 having a square shape; in particular, the geometrical center of the window 9 may be set on the centroidal axis G of the uniaxial accelerometer 1, and two parallel sides of the window 9 may be parallel to a first axis, designated by x in FIG. 1, and the other two parallel sides of the window 9 may be parallel to a second axis, designated by y, orthogonal to the first axis x. The rotor 4 further comprises a plurality of mobile electrodes 10, which extend from the suspended mass 8 towards the inside of the window 9, parallel to the first axis x. The mobile electrodes 10 may all be connected to a same biasing electrode (illustrated schematically and designated by 6 in FIG. 3).

The suspended mass 8 may be supported and biased by a suspension structure, comprising a suspension body 14 and elastic elements 15. In particular, the elastic elements 15 enable movement of the suspended mass 8 along the second axis y, as represented by the two-headed arrow 17.

At least part of the suspension body 14, such as the suspended mass 8, is preferably perforated, so as to allow the rotor 4 to be released during the fabrication of the accelerometer, by etching away an underlying sacrificial-oxide layer in a known manner.

The suspension body 14 having a rectangular shape may be fixed to a rotor-anchoring portion 16, anchored to the substrate (not illustrated) of the chip 3. The rotor-anchoring portion 16 may be arranged centrally with respect to the suspension body 14 and may have its center arranged on the centroidal axis G.

The elastic elements 15 comprise four springs extending in pairs from the corners of the suspension body 14. In particular, the springs 15 may be thin, have an elongated shape and connect the suspension body 14 to the suspended mass 8.

The stator 5 is positioned inside the window 9 and comprises a plurality of fixed electrodes 12, each rigid with a respective stator-anchoring portion 20 that may be anchored to the substrate of the chip 3. The fixed electrodes 12 extend parallel to the first axis x, may be parallel to one another, and each faces a respective mobile electrode 10. In particular, the electrodes are in a single-sided type configuration, i.e., each mobile electrode 10 may be capacitively coupled to just one fixed electrode 12; in other words, just one fixed electrode 12 extends between two consecutive mobile electrodes 10. The positions with respect to one another of the fixed electrodes 12 and of the mobile electrodes 10 along the second axis y may be reversed in the two halves of the window 9 delimited by the suspension body 14. Furthermore, the fixed electrodes 12 belonging to the aforementioned two halves may be short-circuited to one another, and those belonging to one half may be electrically connected to a first biasing electrode, while those belonging to the other half may be electrically connected to a second biasing electrode, the biasing electrodes being represented schematically and designated by 7 and 13, respectively, in FIG. 3.

According to an embodiment of the invention, the uniaxial accelerometer 1 further comprises a compensation structure 24 of a micro-electromechanical type and forming an integral part of the micro-electromechanical structure. In detail, the compensation structure 24 comprises a plurality of compensation electrodes 21, which may be shorted to the rotor mobile electrodes 10 and may be fixed to the suspension body 14 so as to be rigid to the rotor-anchoring portion 16. In this way, the compensation electrodes 21 undergo the same thermomechanical stress as the mobile electrodes 10 but are insensitive to the external accelerations. The compensation electrodes 21, each facing a respective fixed electrode 12, may be opposite to the mobile electrodes 10, along the axis y.

Figure 2:
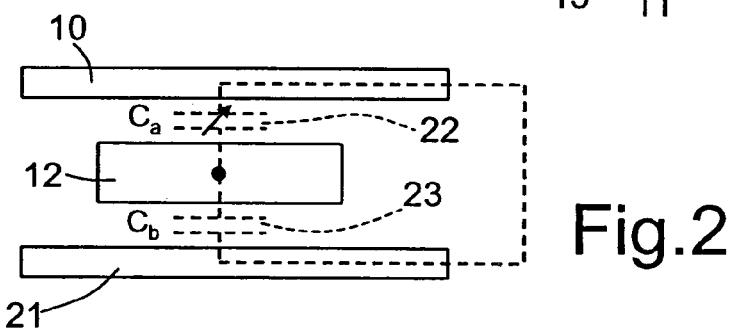
FIG. 2 is a simplified diagram of the uniaxial linear accelerometer of FIG. 1.

The schematic circuit diagram of the thermal compensation obtained via the compensation structure 24 is evident from FIG. 2, which represents schematically the uniaxial accelerometer 1. In detail, a mobile electrode 10 forms, with the respective fixed electrode 12, a first capacitor 22 having a capacitance $C_a$ (hereinafter referred to as detection capacitance) which may be variable with the displacement of the suspended mass 8 in the detection direction of the accelerometer. In fact, this displacement causes a variation in the distance between the mobile electrode 10, rigid to the suspended mass 8 (FIG. 1), and the respective fixed electrode 12, giving rise to a capacitive variation of the first capacitor 22. Furthermore, a compensation electrode 21 forms, with the same fixed electrode 12, a second capacitor 23 having a fixed capacitance $C_b$ (defined hereinafter as compensation capacitance), which may not depend upon the displacement of the suspended mass 8.

As illustrated in FIG. 2, the first and the second capacitors 22, 23 are connected in parallel, so that the detection capacitance $C_a$ and the compensation capacitance $C_b$ sum up, giving rise to an overall capacitance, which, for small displacements, remains constant as the temperature varies and thus may be insensitive to thermal drifts.

In fact, as previously described, the thermal drifts are principally caused by the relative displacements of the stator and rotor anchorages, and consequently of the electrodes rigid therewith, even in the absence of accelerations. As the temperature varies, the capacitances $C_a$ and $C_b$ have an opposite behaviour. In fact, the compensation electrode 21 is rigid with the same rotor anchorage as the mobile electrode 10 and thus undergoes similar thermal stress. Consequently, if for example the fixed electrode 12 and the mobile electrode 10 move towards each other (causing a reduction in the detection capacitance $C_a$), the fixed electrode 12 and the compensation electrode 21 move away for the same distance (causing an equal increase in the compensation capacitance $C_b$). In practice, the compensation capacitance $C_b$ and the detection capacitance $C_a$ have opposite thermal variations, so that their sum $C_a+C_b$, which then determines the output of the accelerometer, may be constant with temperature.

For the structure of FIG. 1, the first capacitors 22 and the second capacitors 23 formed by the mobile electrodes 10 with the fixed electrodes 12 and with the compensation electrodes 21 of each of the two halves of the window 9 may be connected in parallel to one another so that the set of the fixed electrodes 12 and mobile electrodes 10 give rise to two total detection capacitances $C_{1a}$ and $C_{2a}$, variable with the acceleration, and to two total compensation capacitances $C_{1b}$ and $C_{2b}$, not affected by the acceleration, the compensation capacitances being summed to the total detection capacitances $C_{1a}$ and $C_{2a}$. In this case, the position of the fixed electrodes 12 with respect to the mobile electrodes 10 in the two halves of the window 9 cause an opposite variation in the detection capacitances $C_{1a}$ and $C_{2a}$ with displacement. Furthermore, due to the arrangement of the electrodes, the total compensation capacitances $C_{1b}$ and $C_{2b}$ have, in a no stress condition, the same value.

The set of the electrodes thus forms a differential system made up of the capacitances $C_1=C_{1a}+C_{1b}$ and $C_2=C_{2a}+C_{2b}$. Consequently, the differential capacitive variation determining the output of the accelerometer and may be equal to $\Delta C=C_1-C_2$, may not be affected by the presence of the compensation capacitances $C_{1b}$ and $C_{2b}$, that are equal and fixed as the acceleration varies. The compensation electrodes 21 may thus eliminate the effects of the thermal drifts, without altering the sensitivity of the uniaxial accelerometer 1.

Figure 3:
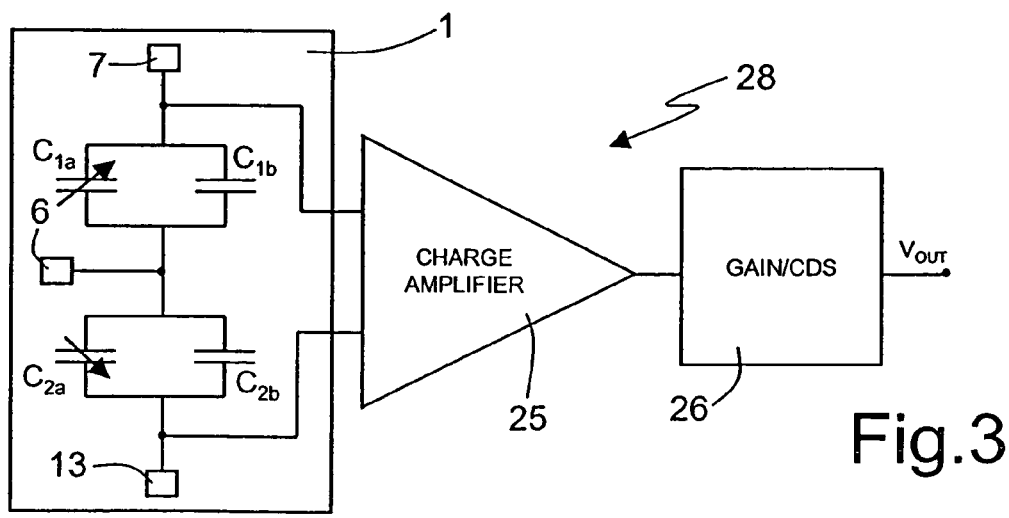
FIG. 3 is a simplified electrical diagram of a sensor which uses the accelerometer of FIG. 1.

FIG. 3 is a schematic illustration of the equivalent electrical circuit of a sensor 28 (for example, an inclinometer), which uses the uniaxial accelerometer 1; FIG. 3 highlights the connections of the capacitances $C_{1a}$, $C_{1b}$, $C_{2a}$ and $C_{2b}$ and the biasing electrodes 6, 7 and 13 that bias the mobile electrodes 10 and the fixed electrodes 12. The output of the uniaxial accelerometer 1 may be connected to a known read circuit which receives the electrical signals corresponding to the differential capacitive variation of the capacitances $C_1$ and $C_2$ and generates an output voltage signal $V_{OUT}$ linked to the detected acceleration. In particular, the read circuit comprises, in one possible embodiment thereof, a charge amplifier 25 and a gain/noise-erasing stage 26 (in particular using the technique of correlated double sampling (CDS).

Figure 4:
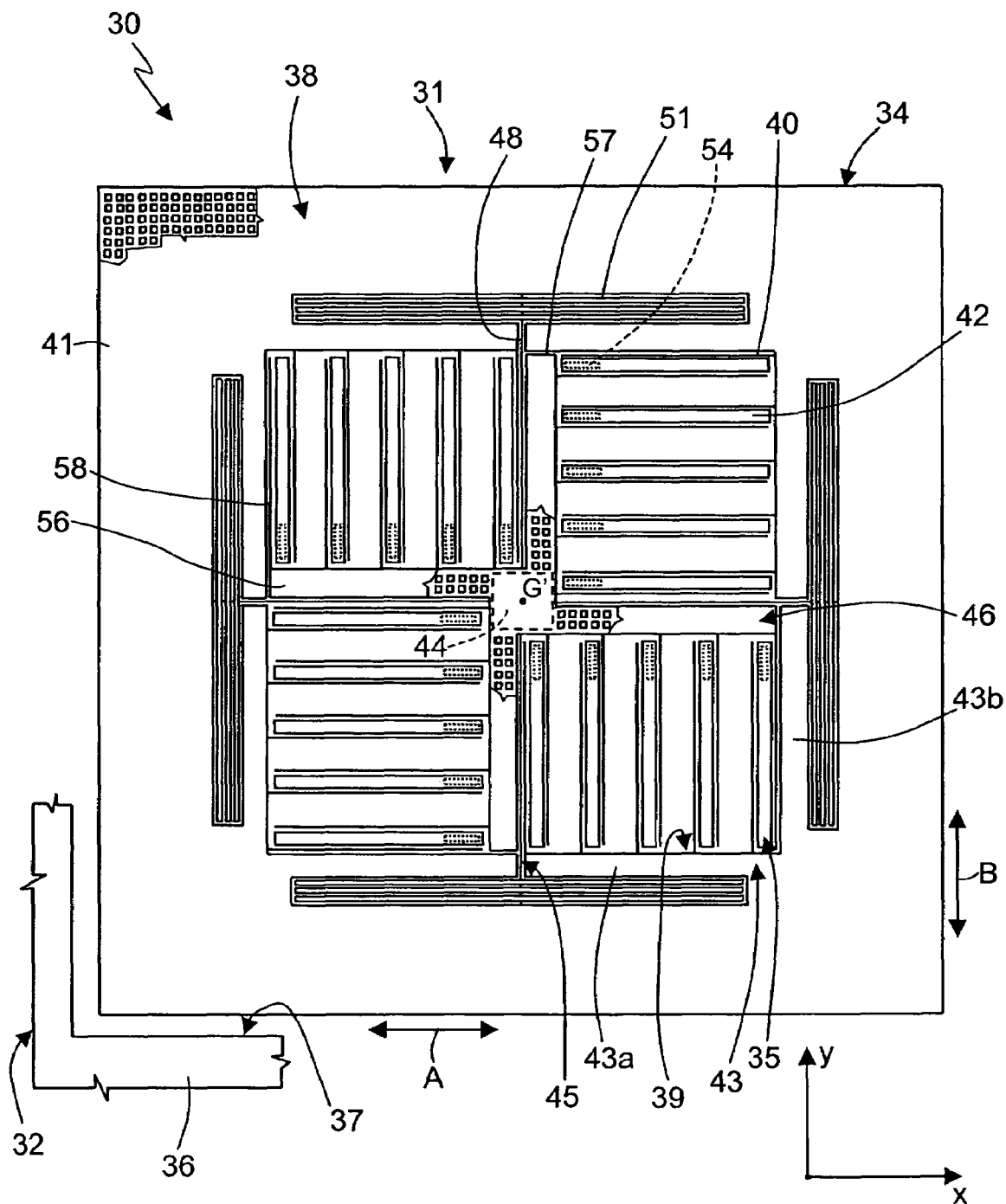
FIG. 4 is a schematic top view of a biaxial linear accelerometer according to a first embodiment of the present invention.

FIG. 4 shows a first embodiment of a biaxial accelerometer 30 of linear type, having a thermal-drifts compensation structure similar to the structure described previously for the uniaxial accelerometer 1.

The biaxial accelerometer 30, integrated in a chip 32 of semiconductor material, comprises a detection structure 31, formed by a rotor 34 and a stator 35. The biaxial accelerometer 30 has a centroidal axis G'.

In detail, the rotor 34 comprises a suspended mass 38, which has a peripheral region 41 substantially square frame-shaped, may be surrounded by a fixed structure 36 and may be separated therefrom by a peripheral trench 37.

The suspended mass 38 may be supported and biased by a suspension structure, comprising a rotor-anchoring element 44 and elastic elements 45.

The rotor-anchoring element 44 has a substantially square shape, may be centered on the centroidal axis G', and may be anchored to the substrate (not illustrated) of the chip 32.

The elastic elements 45 enable movement of the suspended mass 38 along the first axis x and the second axis y, which thus form the detection axes of the biaxial accelerometer 30, indicated by the two-headed arrows A and B. In detail, the elastic elements 45 may be formed by four springs, having a general T shape and each comprising a stem 48 and a head 51. The stems 48 are thin and elongated, and extend from the sides of the rotor-anchoring element 44 up to the peripheral region 41. The heads 51 extend between the respective stem 48 and a side of the peripheral region 41.

The suspended mass 38 further comprises four L-shaped projecting portions 43, arranged inside the peripheral region 41 and connected thereto at its internal corners. The projecting portions 43 may have a first arm 43a and a second arm 43b, of equal length, parallel and adjacent to a respective side of the peripheral region 41, and define, together with the stems 48 of the springs 45, four openings 39. The suspended mass 38 and the projecting portions 43 are preferably perforated so as to allow the rotor 34 to be released during the manufacture of the accelerometer, by etching away an underlying sacrificial oxide layer, in a known manner.

The rotor 34 further comprises a plurality of mobile electrodes 40, which extend within each opening 39 from the arm 43a, orthogonally to the arm. In particular, the direction of the mobile electrodes 40 may be rotated through 90° within contiguous openings 39.

The stator 35 comprises a plurality of fixed electrodes 42, each arranged parallel to and facing a respective mobile electrode 40 within an opening 39 in a single-sided configuration. Each fixed electrode 42 may be anchored to the substrate of the chip 32 via a stator-anchoring portion 54. The stator-anchoring portions 54 may be arranged within each opening 39 in the proximity of the stem 48 of an adjacent elastic element 45, aligned to the stem 48.

In particular, the fixed electrodes 42 of two non-adjacent openings 39 may be parallel and enable the detection of movements with respect to one and to the same axis of detection, in a differential configuration, as described previously with reference to the uniaxial accelerometer 1 of FIG. 1.

According to an embodiment, the biaxial accelerometer 30 further comprises a compensation structure 46. The latter comprises four rectangular arms 56, each extending within an opening 39, from the rotor-anchoring element 44, parallel and adjacent to a stem 48 of an elastic element 45.

The arms 56 may be orthogonal to the mobile electrodes 40 and to the fixed electrodes 42 of the respective opening 39. Furthermore, the arms 56 may be separated both from the mobile electrodes 40 and from the fixed electrodes 42 by the stems 48 and by the projecting portions 43, and may be contiguous to the respective stator-anchoring portions 54.

The compensation structure 46 further comprises a plurality of compensation electrodes 58 extending from the arms 56 and each facing a respective fixed electrode 42 in an opposite position with respect to the mobile electrodes 40. The compensation electrodes 58 may be shorted to the mobile electrodes 40 and form with these a plurality of compensation capacitances that enable compensation of the thermal drifts caused by the thermomechanical stress in a way similar to what described with reference to the uniaxial accelerometer of FIG. 1.

Figure 5:
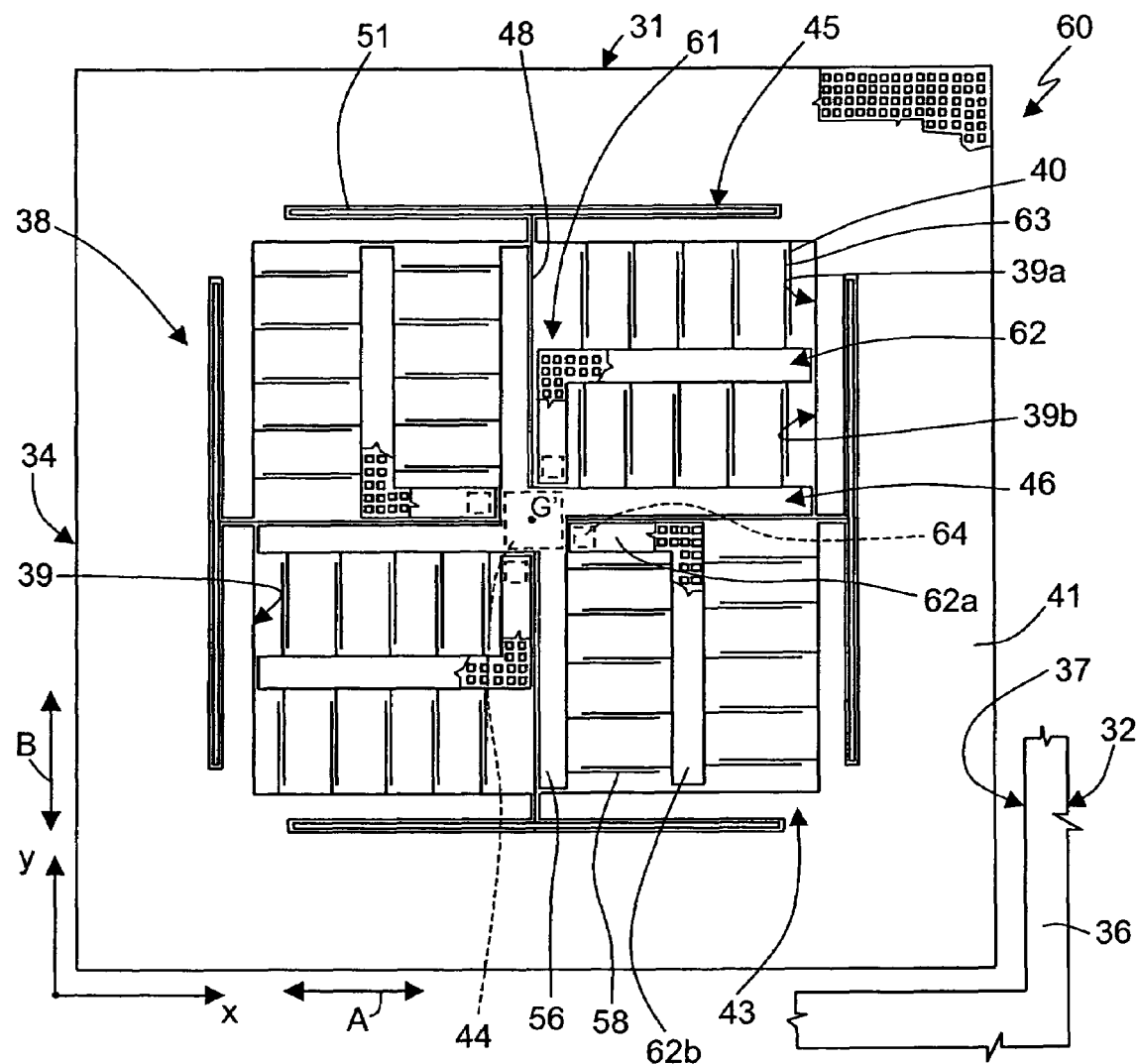
FIG. 5 is a schematic top view of a second embodiment of a biaxial linear accelerometer.

FIG. 5 shows a second embodiment of a biaxial accelerometer, designated by the reference number 60. The second embodiment is similar to the embodiment of FIG. 4 so that parts that are similar will be designated by the same reference numbers and will not be described again.

The biaxial accelerometer 60 comprises a stator, 61, formed by four stator elements 62, each of which carries a plurality of fixed electrodes 63. The stator elements 62 and the corresponding fixed electrodes 63 enable, in pairs, movement detection with respect to a same detection axis in a differential configuration, as described previously with reference to the case of the biaxial accelerometer 30 of FIG. 4.

In particular, the stator elements 62 are substantially L-shaped and may be positioned each within a respective opening 39. Each stator element 62 has a base 62a and a body 62b. Each base 62a may be adjacent and parallel to the stem 48 of a respective elastic element 45, and extends for a length equal to approximately one half of the side of the respective opening 39. Each body 62b extends throughout the length of the opening 39 up to the respective projection 43 (without contact) and may be parallel to the rectangular arm 56 extending within the same opening 39. The body 62b thus divides the corresponding opening 39 into two rectangular halves 39a, 39b.

Each stator element 62 may be anchored to the substrate via a stator-anchoring portion 64 formed by the end close to the rotor-anchoring element 44 of each base 62a and thus close to the centroidal axis G'.

The fixed electrodes 63 extend perpendicularly to the body 62b on both of the long sides of the body 62b. In particular, in the half 39a, the fixed electrodes 63 may be parallel to and face the mobile electrodes 40 extending from the side 43a of the projection 43, forming therewith a plurality of parallel-connected detection capacitances. In the half 39b, the fixed electrodes 63 may be, instead, parallel to and face the compensation electrodes 58 extending from the arm 56, forming therewith a plurality of compensation capacitances. In this way, it may be possible to compensate the thermal drifts in the same manner as discussed with reference to the uniaxial accelerometer of FIG. 1.

With the second embodiment it is possible to arrange stator anchorages, common to a plurality of fixed electrodes 63, in the proximity of the centroidal axis G' of the structure and hence in the proximity of the rotor-anchoring portion 44. Thereby, minimization of the relative displacements between the stator and rotor anchorages and thus minimization of the thermal drifts due to the deformation of the chip may be obtained. The smaller the drifts to be compensated, the greater the effectiveness of the self-compensation ensured by the compensation structure according to the present invention.

With the accelerometers described, it may be possible to integrate the compensation structure within the micro-electromechanical structure, without requiring additional electronic components and without the need for complicated setting and calibration procedures. In practice, a self-compensation in temperature may be obtained that is intrinsic to the micro-electromechanical structure.

The structure described enables a greater stability in temperature to be achieved as compared to solutions of a known type and is for example advantageously usable in applications that require high precision of measurement, for instance to manufacture an inclinometer.

In this way, it may be moreover possible to prevent the use of particular packages dedicated to the sensors (such as pre-moulded, full-moulded with gel or ceramics packages) and to use standard and thus less costly packages.

Furthermore, the configuration described with reference to FIG. 5, in which the rotor and stator anchorages are close to one another and close to the center of gravity of the accelerometer, enables reduction in thermomechanical stress, allowing an even more precise self-compensation of the disturbance.

Finally, it is evident that modifications and variations can be made to what is described and illustrated herein, without thereby departing from the scope of the present invention, as defined in the annexed claims.

For example, the stator fixed electrodes and the rotor mobile electrodes in the detection structure of the micro-electromechanical sensor could have a comb-fingered configuration and not a single-sided configuration, as described previously with reference to FIGS. 1, 4 and 5.

Figure 6:
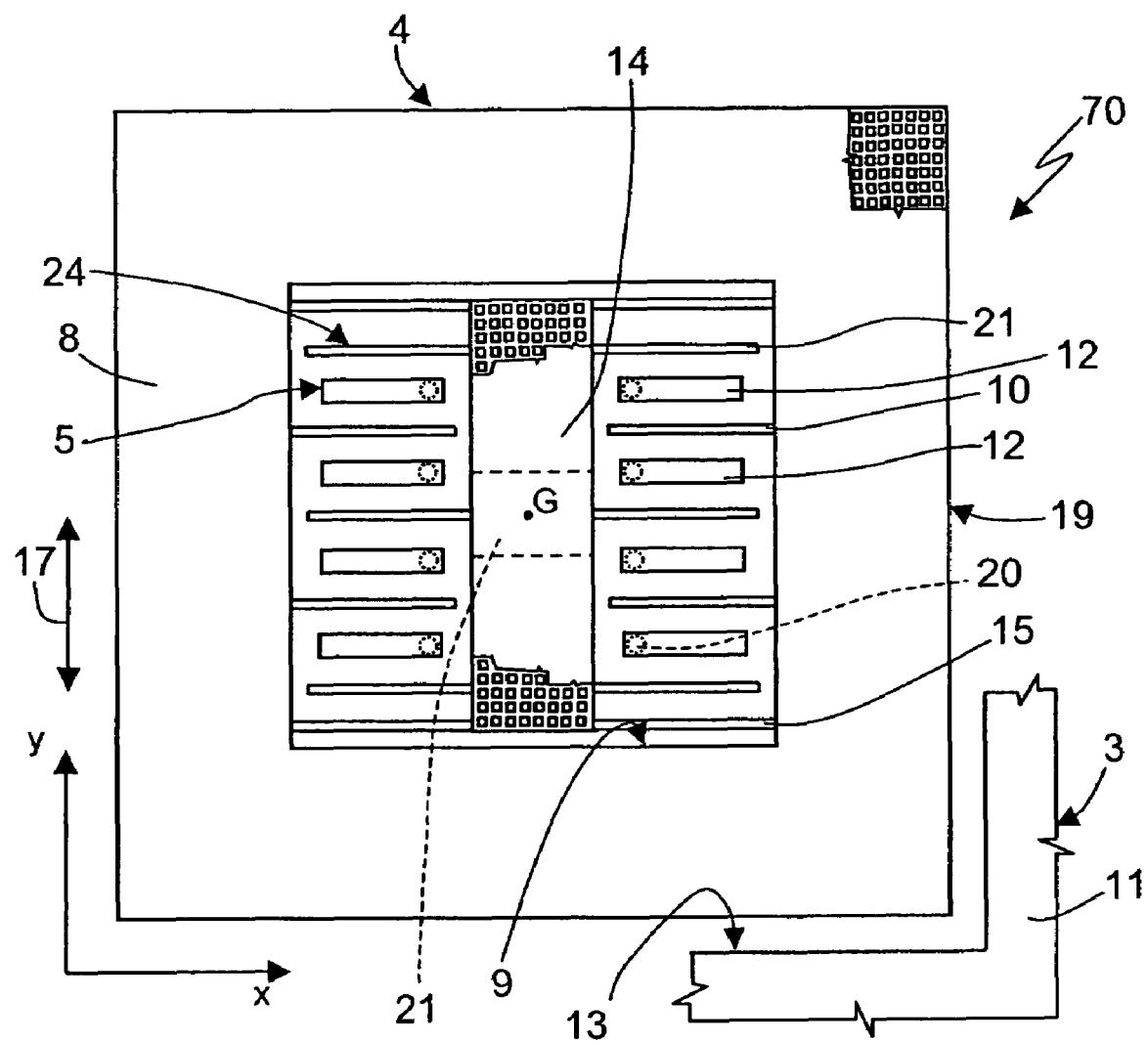
FIG. 6 is a schematic top view of an alternative embodiment of the uniaxial linear accelerometer of FIG. 1.

FIG. 6, for example, illustrates an alternative embodiment of the uniaxial accelerometer of FIG. 1, designated herein by the reference number 70, in which the configuration of the electrodes is comb-fingered. In particular, each mobile electrode 10 faces two fixed electrodes 12, which are electrically insulated from one another and connected to respective biasing electrodes (in a way analogous to the biasing electrodes 7 and 13 of FIG. 3). The compensation structure 24 also comprises, in this case, compensation electrodes 21, shorted to one another and to the mobile electrodes 10. In particular, the long side of each fixed electrode 12, which does not face the corresponding mobile electrode 10, face a respective compensation electrode 21.

Alternatively, it is moreover possible to arrange the compensation electrodes 21 so that they face the same side of the fixed electrodes 12 as the mobile electrodes 10, even though, in this case, thermal drifts do not cause opposite capacitive variations, so that the read circuit is more complicated. In addition, here an electrical insulation must be provided between the compensation electrodes 21 and the mobile electrodes 10.

Furthermore, the electrodes in the micro-electromechanical structure may be arranged so as to cause different overall compensation capacitances $C_{1b}$ and $C_{2b}$. In this case, however, this difference should be electronically compensated, in order not to alter the sensitivity of the accelerometer.

Finally, the idea underlying the present invention can be applied to various types of microstructures, such as for example gyroscopes, inertial sensors, and rotational accelerometers. More in general, the present invention finds advantageous application in all those microstructures that have fixed and mobile suspended masses, irrespective of the fabrication technique (via epitaxial growth, surface or bulk micromachining) and the used material (mono- or polycrystalline silicon, whether deposited or grown, or metallic materials).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A micro-electromechanical structure of semiconductor material, comprising:
    a detection structure including a stator and a rotor, which are mobile with respect to one another in presence of an external stress and are subject to thermal stress;
    a micro-electromechanical compensation structure subject to said thermal stress and invariant with respect to said external stress, said compensation structure being connected to said detection structure such that said micro-electromechanical compensation structure supplies an output signal correlated to said external stress and compensated in temperature.

2. The structure according to claim 1, wherein:
    said rotor comprises a suspended structure carrying mobile electrodes;
    said stator comprises fixed electrodes, some of said fixed electrodes facing and capacitively coupled to said mobile electrodes, thereby forming first capacitors having a capacitance variable with said external stress; and said compensation structure comprises fixed compensation electrodes, facing and capacitively coupled to at least some of said fixed electrodes, thereby forming second capacitors with constant capacitance as said external stress varies.

3. The structure according to claim 2, wherein said compensation electrodes are arranged on an opposite side of said fixed electrodes with respect to said mobile electrodes.

4. The structure according to claim 2, wherein:
said fixed electrodes include first and second sets of electrodes, the electrodes of each set of electrodes being shorted to one another and electrically biased by a first biasing electrode and by a second biasing electrode, respectively, and forming with said mobile electrodes a first capacitor and a second capacitor having capacitances that are variable in an opposite direction as said external stress varies;
said mobile electrodes are shorted to one another and electrically biased by a third biasing electrode; and
said fixed electrodes, said mobile electrodes, and said compensation electrodes form a differential capacitive system supplying said output signal.

5. The structure according to claim 4, wherein:
said rotor has a centroidal axis; and
said stator comprises a pair of sets of electrodes for each detection direction, said sets of electrodes being arranged symmetrically with respect to said centroidal axis.

6. The structure according to claim 2, wherein:
said suspended structure is connected to a rotor-anchoring region; and
said compensation electrodes are rigid with said rotor-anchoring region, said compensation electrodes being electrically shorted to said mobile electrodes such that said second capacitors are connected in parallel to said first capacitors.

7. The structure according to claim 6, wherein said mobile electrodes and said fixed electrodes are arranged in single-sided configuration, wherein each mobile electrode faces just one fixed electrode.

8. The structure according to claim 6, wherein said mobile electrodes and said fixed electrodes are arranged in comb-fingered configuration, wherein each mobile electrode faces two fixed electrodes.

9. The structure according to claim 6, wherein
said rotor has a centroidal axis;
said rotor-anchoring region is centered with respect to said centroidal axis;
said suspended structure comprises a peripheral region having a generally frame-like shape defining a plurality of sides, opposite one another in pairs, and delimiting at least one window;
mobile electrodes extend from said suspended structure within said window parallel to the sides of said peripheral region; and
said stator is arranged within said window surrounded by said rotor.

10. The structure according to claim 9, comprising a uniaxial linear accelerometer.

11. The structure according to claim 9, wherein:
said peripheral region is connected to said rotor-anchoring region through elastic elements and through a suspension body having a rectangular shape;
said rotor-anchoring region is formed by a central portion of said suspension body;
said elastic elements extend from a respective corner of said suspension body; and;
said fixed electrodes are anchored each to a respective stator-anchoring region.

12. The structure according to claim 9, comprising a biaxial linear accelerometer.

13. The structure according to claim 9, wherein:
said suspended structure comprises four supporting portions carrying said mobile electrodes and extending inside said peripheral region at a respective corner thereof;
said supporting portions are aligned to the sides of said peripheral region;
said compensation structure comprises four arms delimiting, together with said peripheral region, four windows, each arm being fixed to and extending from said rotor-anchoring region within a respective window orthogonally to said fixed electrodes and to said mobile electrodes; and
said compensation electrodes extend from, and orthogonally to, said arms.

14. The structure according to claim 13, wherein:
said peripheral region is connected to said rotor-anchoring region through elastic elements comprising spring elements; and
each of said spring elements comprises a stem extending from a side of said rotor-anchoring region towards a facing side of said peripheral region.

15. The structure according to claim 13, wherein:
said fixed electrodes are anchored each to a respective stator-anchoring region; and
said stator-anchoring regions are aligned along a direction parallel to one of said arms.

16. The structure according to claim 13, wherein:
said stator comprises four L-shaped stator elements, each carrying a plurality of fixed electrodes;
each of said stator elements comprises a base, parallel to said mobile electrodes and extending for a portion of said window, and a body, extending parallel to one of said arms, each base comprising a stator-anchoring region in the proximity of said rotor-anchoring region; and
said fixed electrodes extend from both of the sides of said body.

17. The structure according to claim 1, wherein said external stress is an acceleration and said micro-electromechanical structure comprises an accelerometer.

18. A method of self compensating thermal drifts in a micro-electromechanical structure of semiconductor material, the method comprising:
providing a detection structure including a stator and a rotor, which are mobile with respect to one another in presence of an external stress and are subject to thermal stress;
connecting said detection structure to a compensation structure of micro-electromechanical type subject to said thermal stress and invariant with respect to said external stress; and
biasing said detection structure and said compensation structure, thereby generating an output signal correlated to said external stress and compensated in temperature.

19. An inclinometer, comprising:
an acceleration sensor of semiconductor material, the acceleration sensor having an output;
a signal-processing circuit connected to the output of said sensor; and wherein said acceleration sensor includes:
  a detection structure including a stator and a rotor, which are mobile with respect to one another in presence of an external stress1 and are subject to thermal stress;
  a micro-electromechanical compensation structure subject to said thermal stress and invariant with respect to said external stress, the compensation structure being connected to said detection structure such that said micro-electromechanical compensation structure supplies an output signal correlated to said external stress and compensated in temperature.

20. A micro-electromechanical structure of semiconductor material, comprising:
  a stator fixed to a stator anchoring portion;
  a rotor elastically coupled to a rotor-support element, the rotor including a rotor electrode that is capacitively coupled to the stator to form a first capacitor having a first capacitance; and
  a compensation electrode fixed to the rotor-support element and capacitively coupled to the stator to form a second capacitor having a second capacitance wherein the rotor electrode and the compensation electrode move in a similar manner responsive to a thermal stress.

21. The structure of claim 20, wherein the rotor is elastically coupled to the rotor-support element such that the rotor moves in a first dimension responsive to an external acceleration.

22. The structure of claim 20 wherein the rotor electrode and the compensation electrode are located on opposite sides of the stator.

23. The structure of claim 22, wherein a sum of a distance between the stator and the rotor electrode and a distance between the stator and the compensation electrode remain substantially constant responsive to the thermal stress.

24. The structure of claim 20, wherein the first capacitance varies responsive to an external force.

25. The structure of claim 24, wherein the second capacitance is fixed responsive to the external force.

26. The structure of claim 25, wherein the first capacitance and the second capacitance vary responsive to a thermal stress.

27. The structure of claim 26, wherein a total capacitance associated with a parallel combination of the first capacitor and the second capacitor remains substantially constant responsive to the thermal stress.

28. A method of detecting acceleration with a micro-electromechanical structure of semiconductor material, the method comprising:
  moving a rotor including a rotor electrode, relative to a rotor-support element, responsive to an external acceleration;
  holding a stator fixed, relative to a stator anchoring portion, in the presence of the external acceleration;
  holding a compensation electrode fixed, relative to the rotor-support element, in the presence of the external acceleration; and
  moving the rotor electrode and the compensation electrode responsive to a thermal stress.

29. The method of claim 28 further comprising
  generating an electric field between the rotor electrode and the stator to form a first capacitor with a first capacitance; and
  generating an electric field between the compensation electrode and the stator to form a second capacitor with a second capacitance.

30. The method of claim 29 further comprising:
  changing the first capacitance responsive to the external acceleration; and
  holding the second capacitance fixed responsive to the external acceleration.

31. The method of claim 29 further comprising:
  changing the first capacitance by a first amount responsive to a thermal stress; and
  changing the second capacitance by a second amount that is opposite to the first amount responsive to the thermal stress.

32. The method of claim 28 further comprising
  detecting a total capacitance associated with a parallel combination of the first capacitor and the second capacitor.

33. The method of claim 32 further comprising changing the total capacitance responsive to the external acceleration.

34. The method of claim 32 further comprising holding the total capacitance fixed responsive to a thermal stress.

35. The method of claim 18 wherein the connecting said detection structure to a compensation structure comprises connecting a capacitance of the detection structure in parallel with a capacitance of the compensation structure.

36. The inclinometer of claim 19 wherein the detection structure comprises a first capacitor and the compensation structure comprises a second capacitor, and wherein the first and second capacitors are configured to vary inversely with respect to each other in response to thermal stress.

* * * * *

UNITED STATES PATENT AND TRADEMARK OFFICE
CERTIFICATE OF CORRECTION

| | | |
|---|---|---|
| PATENT NO. | : 7,520,171 B2 | Page 1 of 1 |
| APPLICATION NO. | : 11/226930 | |
| DATED | : April 21, 2009 | |
| INVENTOR(S) | : Angelo Merassi et al. | |

It is certified that error appears in the above-identified patent and that said Letters Patent is hereby corrected as shown below:

Column 9
Lines 44-45, "in comb-fingered" should read as --in a comb-fingered--

Line 47, "The structure according to claim 6, wherein" should read as --The structure according to claim 6, wherein:--

Column 10
Line 12, "aligned to the sides of said" should read as --aligned to sides of said--

Line 44, "electrodes extend from both of the sides of said" should read as --electrodes extend from two sides of said--

Column 11
Line 4, "an external stress1" should read as --an external stress,--

Column 12
Line 30, "The method of claim 28" should read as --The method of claim 29--

Line 37, "fixed responsive to a thermal stress." should read as --fixed responsive to the thermal stress.--

Signed and Sealed this
Nineteenth Day of July, 2011

David J. Kappos
*Director of the United States Patent and Trademark Office*